US005604039A

United States Patent [19]
Chen et al.

[11] Patent Number: 5,604,039
[45] Date of Patent: Feb. 18, 1997

[54] THERMALLY STABLE RELEASE AGENTS

[75] Inventors: Tsang J. Chen, Rochester; Paul L. Nielsen, Lima; Jiann-Hsing Chen, Fairport, all of N.Y.

[73] Assignee: Eastman Kodak Company, Rochester, N.Y.

[21] Appl. No.: 589,666

[22] Filed: Jan. 22, 1996

[51] Int. Cl.$^6$ .................................................. B32B 9/04
[52] U.S. Cl. .................... 428/447; 106/287.14; 106/2; 528/43
[58] Field of Search .................... 106/287.14, 2; 428/447; 528/43

[56] References Cited

U.S. PATENT DOCUMENTS

| | | | |
|---|---|---|---|
| 4,029,827 | 6/1977 | Imperial et al. | 427/22 |
| 4,065,586 | 12/1977 | Eddy et al. | 427/22 |
| 4,170,957 | 10/1979 | Eddy et al. | 118/60 |
| 4,185,140 | 1/1980 | Strella et al. | 428/418 |
| 4,254,733 | 3/1981 | Namiki | 118/60 |
| 4,426,953 | 1/1984 | Kromm, Jr. et al. | 118/60 |
| 4,488,504 | 12/1984 | Vineski | 118/60 |
| 4,659,621 | 4/1987 | Finn et al. | 428/339 |
| 4,770,116 | 9/1988 | Moser | 118/60 |
| 4,807,341 | 2/1989 | Nielsen et al. | 29/132 |
| 4,853,737 | 8/1989 | Hartley et al. | 355/289 |
| 4,952,657 | 8/1990 | Riding et al. | 528/27 |
| 4,970,559 | 11/1990 | Miyabayashi | 355/290 |
| 5,017,432 | 5/1991 | Eddy et al. | 428/422 |
| 5,025,074 | 6/1991 | Davis et al. | 528/15 |
| 5,039,772 | 8/1991 | Davis et al. | 528/15 |
| 5,041,514 | 8/1991 | Webb et al. | 528/25 |
| 5,138,012 | 8/1992 | Riding et al. | 525/478 |
| 5,157,445 | 10/1992 | Shoji et al. | 355/284 |
| 5,166,031 | 11/1992 | Badesha et al. | 430/124 |
| 5,233,008 | 8/1993 | Chen et al. | 528/33 |
| 5,236,768 | 8/1993 | Fujii et al. | 428/195 |
| 5,281,506 | 1/1994 | Badesha et al. | 430/124 |
| 5,285,248 | 2/1994 | Menjo et al. | 355/284 |
| 5,362,833 | 11/1994 | Chen et al. | 528/25 |
| 5,395,725 | 3/1995 | Bluett et al. | 430/124 |

*Primary Examiner*—Margaret Glass
*Attorney, Agent, or Firm*—Anne B. Kiernan

[57] ABSTRACT

This invention provides a release agent consisting of a blend of poly(organosiloxane) fluid and phenol-functionalized poly(organosiloxane) fluid which when used at elevated temperatures does not produce insoluable or undesirable by-products or gellation. The release agent is particularly suited for application to a fuser member for fusing toner images to a receiver.

17 Claims, 1 Drawing Sheet

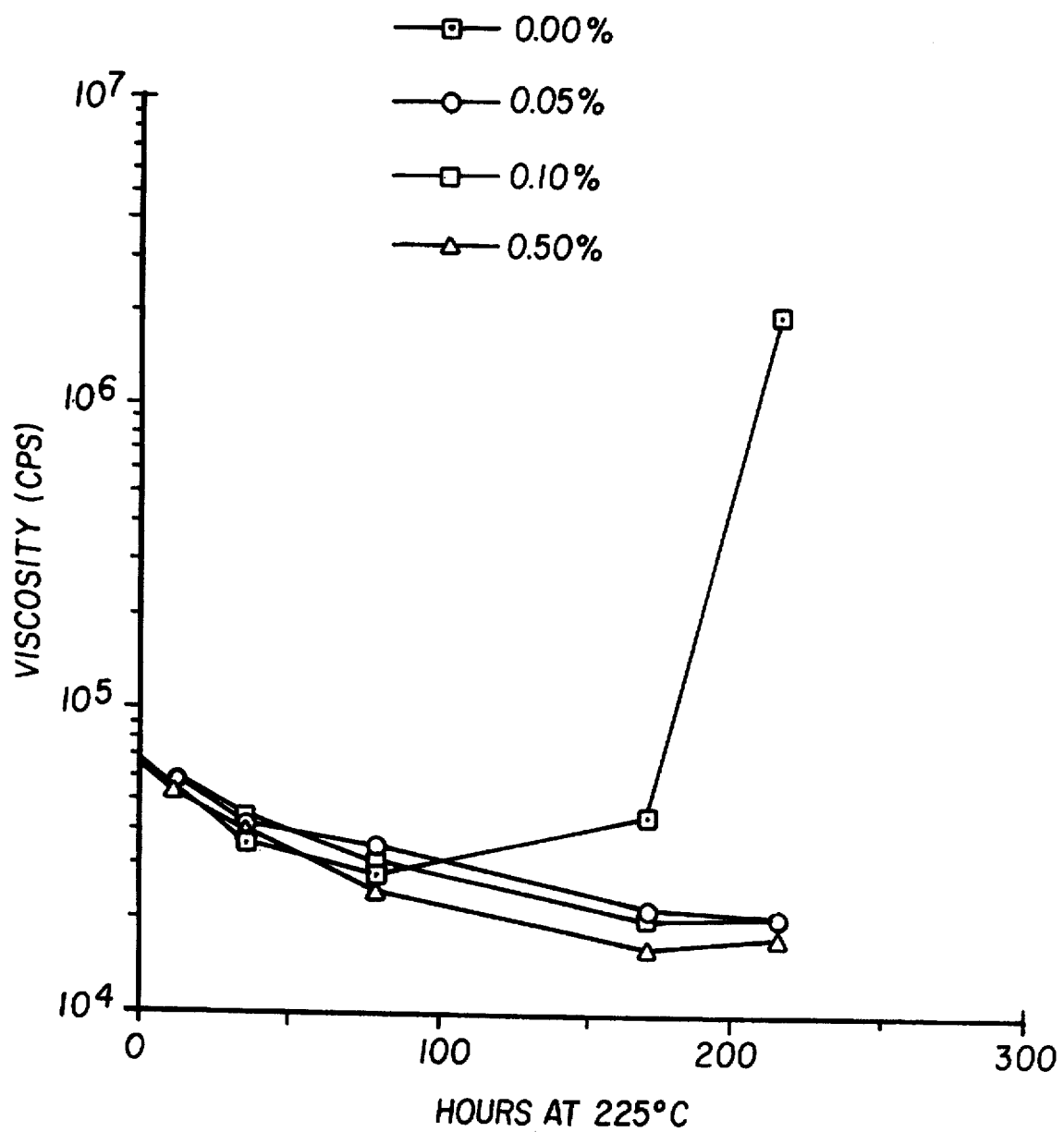

THERMALLY STABLE RELEASE AGENTS

FIELD OF THE INVENTION

This invention relates to thermally stable release agents or lubricants used in numerous industrial applications. More specifically, this invention relates to new thermally stable release agents useful for application onto the surface of fuser members which are used to fuse toner to a receiver.

BACKGROUND

Conventional silicone fluids (trimethylsiloxy-terminated polydimethylsiloxanes) are widely used as lubricants and release aids, as well as cooling and heating media in numerous industrial applications. These fluids may be used at 150° C. continuously in air for long periods of time, without significantly losing their useful properties; however, at about 200° C. or above, oxidative thermal aging takes place, and the fluids gradually turn into gels.

Many antiaging agents, such as substituted catechols, p-aminophenol, diphenylamine, 2-phenylhydroquinone, naphthols, metal chelate compounds, particularly the acetylacetonates of numerous heavy metals, pyrene, and iron octoate, have been used as additives for preventing or postponing the process of gellation of PDMS oils at elevated temperatures, but most of these compounds are difficult to incorporate uniformly, and often form undesirable oxidized by-products.

U.S. Pat. No. 4,185,140 discloses the use for fuser members of polymeric release agents having functional groups such as carboxy, hydroxy, epoxy, amino, isocyanate, thioether or mercapto groups. The functional polymeric fluids interact with the fuser member to strongly attach to the fuser member to prevent toner from contacting the fuser member.

U.S. Pat. No. 5,395,725 discloses the blend of at least one mercapto-functionalized silicone oil with at least one non-mercapto-functionalized silicone oil to minimize volatile emissions from the silicone oil.

Therefore, a need exists for providing improved release agents which can be used at elevated temperatures without producing insoluble or undesirable by-products or gellation.

SUMMARY OF THE INVENTION

This invention provides a release agent comprising of a blend of non-phenol-functionalized poly(organosiloxane) fluid and phenol-functionalized poly(organosiloxane) fluid.

This invention further provides a fuser member for fusing toner images to a receiver, having a release agent applied to the surface of the fuser member, said release agent comprising of a blend of non-phenol-functionalized poly(organosiloxane) fluid and phenol-functionalized poly(organosiloxane) fluid.

The release agent of this invention can be used at elevated temperatures, for example temperatures above 200° C. without producing insoluble or undesirable by-products and without undergoing a substantial increase in viscosity.

BRIEF DESCRIPTION OF THE FIGURE

The benefits of the release agents of this invention will be better understood by reference to the figure.

FIG. 1 shows the stability of release agents of the invention at 225° C.

DETAILED DESCRIPTION OF THE INVENTION

This invention provides a release agent which is a fluid at the operating temperatures and preferably is a fluid at room temperature. The terms fluid and oil have the same meaning and may be used interchangeably to describe the polysiloxanes used in this invention.

The non-phenol-functionalized poly(organosiloxane) fluid used in the release agent of this invention is preferably a non-reactive, non-functionalized poly(organosiloxane) fluid, preferably trimethylsilyl-terminated. The preferred non-phenol-functionalized poly(organosiloxane) fluids are poly(diorganosiloxane) fluids, particularly, poly(dimethylsiloxane) (PDMS) or poly(dimethyldiphenylsiloxane); however, other alkylated, arylated or alkylarylated polymer or copolymer poly(organosiloxane) fluids are useful in this invention, such as, poly(methylpropylsiloxane), poly(methyloctylsiloxane) or poly(methylphenylsiloxane).

The preferred poly(dimethylsiloxane) or PDMS, is a non-reactive, non-functionalized, trimethylsiloxy-terminated poly(dimethylsiloxane) fluid or oil having the following structure:

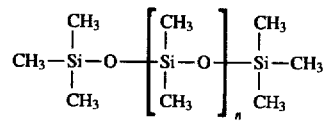

where n is preferably a number from 1 to 300, more preferably n is 50 to 200. The preferred viscosities of the PDMS are from 1 to 100,000 centistokes (ctsk), more preferably 50 to 60,000 ctsk at 25° C. The preferred weight average molecular weight range for the PDMS is 200 to 140,000, more preferably 4,000 to 120,000. PDMS oils useful in this invention can be prepared by a catalyzed ring opening of octamethylcyclotetrasiloxane as described in the literature, for example, McGrath, et al, ACS Symposium Series 286, page 147. PDMS fluids are commercially available from G.E., Dow Corning, and Petrarch. For example, PDMS fluids are available under the trade names PS040, PS041, PS042 and others from Petrarch.

The preferred poly(dimethyldiphenylsiloxane) is a non-reactive, non-functionalized trimethylsiloxy-terminated poly(dimethyldiphenylsiloxane) fluid having the following structure:

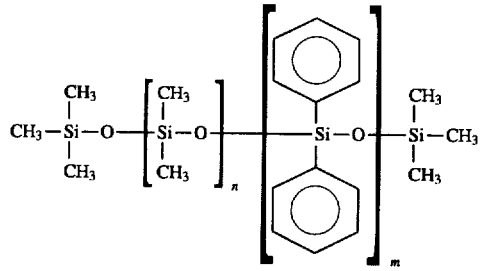

where n is preferably a number from 1 to 300, more preferably n is 50 to 200 and m is preferably a number from 1 to 300, more preferably m is 50 to 200. The viscosities of the poly(dimethyldiphenylsiloxane) fluids are preferably from 1 to 100,000 ctsk, more preferably 50 to 60,000 ctsk at 25° C. The preferred weight average molecular weight range for the poly(dimethyldiphenylsiloxane) is 200 to 140,000, more preferably 4,000 to 120,000. Poly(dimethyldiphenylsiloxane) fluids useful in this invention can be prepared by ring opening of a mixture of octamethylcyclotetrasiloxane and octaphenylcylcotetrasiloxane as described in the literature, for example see McGrath et al, Id. Poly(dimethyldiphenylsiloxane) fluids are commercially available from G.E., Dow Corning and Petrarch. For example, poly(dimethyldiphenylsiloxane) fluids are available under the trade names PS060, PS061, and others from Petrarch.

Mixtures of non-phenol-functionalized poly(organosiloxane) fluids can be used in the release agent. The most preferred poly(organosiloxane) fluids are PDMS fluids.

The phenol-functionalized poly(organosiloxane) fluids are preferably alkylated, arylated or alkylarylated polymer or copolymer poly(organosiloxane) fluids with at least one phenol group substituted on one or both ends of the siloxane chain or on a side chain off the siloxane chain or any combination of locations. Examples of phenol-functionalized poly(organosiloxane) fluids include phenol-functionalized poly(dimethylsiloxane), phenol-functionalized poly(dimethyldiphenylsiloxane), or phenol-functionalized poly(methyloctylsiloxane). The preferred phenol-functionalized poly(organosiloxane) is phenol-functionalized poly(dimethylsiloxane) referred to herein as "phenol-functionalized PDMS". The phenol-functionalized PDMS is preferably characterized by the following structure:

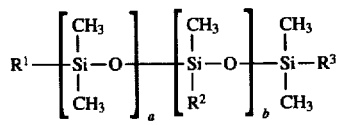

where $R^1$, $R^2$ and $R^3$ are independently methyl or a phenol group; where at least one of $R^1$, $R^2$ and $R^3$ is a phenol group, and when $R^2$ is a phenol group, a is preferably 40 mol % to 99.5 mol %; and b is preferably 0.5 mol % to 60 mol % based on 100 mol %. The preferred viscosity for the phenol-functionalized PDMS is 2 to 10,000 ctsk at 25° C., and the preferred weight average molecular weight for the phenol-functionalized PDMS is 400 to 62,000. It is preferred that $R^1$ and $R^3$ are phenol groups and $R^2$ is methyl.

The phenol group consists of at least one phenol and preferably has the following structure:

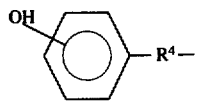

where $R^4$ is an organic linking group, such as $C_{1-30}$ alkyl, aryl, or alkylaryl or

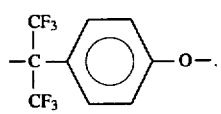

The more preferred phenol groups are

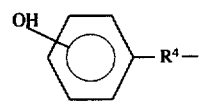

where $R^4$ is a $C_{2-10}$ alkyl or

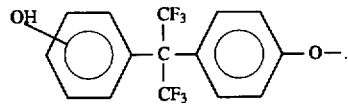

The preferred range for the molecular weight for the phenol group is 130 to 325.

The release agent of the invention preferably comprises from 0.0001% to 10% by weight of the phenol-functionalized poly(organosiloxane) fluid and 90% to 99.9999% by weight non-phenol-functionalized poly(organosiloxane), more preferably from 0.01% to 1% by weight of phenol-functionalized poly(organosiloxane) fluid and 99% to 99.99% by weight non-phenol-functionalized poly(organosiloxane) fluid.

The viscosity of the release agent should not be affected much, if at all, upon the addition of phenol-functionalized poly(organosiloxane) to the non-phenol-functionalized poly(organosiloxane) fluid.

To prepare the release agent of this invention, the non-phenol-functionalized poly(organosiloxane) fluid and phenol-functionalized poly(organosiloxane) fluid are blended by a gentle stirring, with or without a mechanical stirrer. It is not necessary to heat or mill the mixture in order to obtain a smooth, uniform product.

One method of preparing the phenol-functionalized poly(organosiloxane) used in the release agents of this invention is by adding unsaturated phenol compounds, such as allyl phenols, and vinyl phenols to a solution of hydride-functional poly(organosiloxane), which can be hydride-terminated PDMS, such as PS537, PS542, PS543, and PS545 from Petrarch Systems, or organo-hydrosiloxane polymers and copolymers, such as PS118, PS119, PS120, PS122, PS122.5, PS123, PS123.5, PS124.5, PS125, PS125.5, PS128, PS129.5, PS129.8 from Petrarch Systems. Platinum catalyst, such as PC072, PC075, and PC085 from Petrarch Systems which contains 2–3% by weight platinum in the form of chloroplatinic acid complex, may be used at levels ranging from 0.0001% to 0.1% by weight preferably from 0.001 to 0.01% by weight based on polyorganosiloxane. Examples of the silane additions are shown as follows:

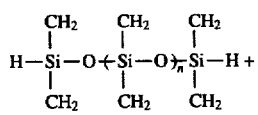

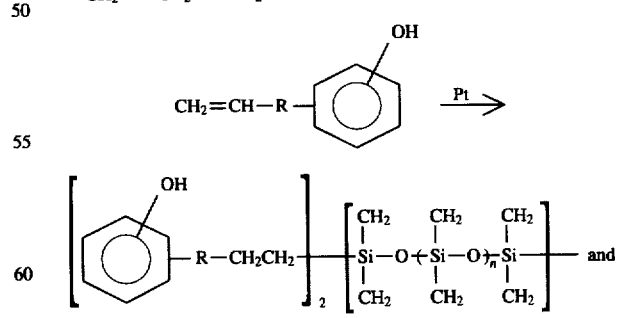

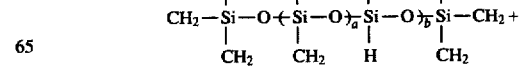

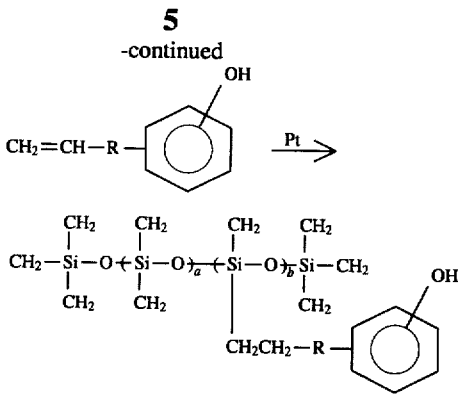

where n is 6 to 1,000, a is 13 to 1,000 and b is 1 to 600.

When preparing the phenol-functionalized poly(organosiloxane) fluids by this method, more than one equivalent amount of unsaturated phenol compound may be added to the solution (toluene or other solvent) excess phenol compound can later be removed by vacuum distillation, or by pouring the final mixture into a non-solvent media for the addition product, such as methanol. The course of the silane addition reaction may be monitored by IR and NMR spectra. The reaction is normally complete in about 4 hours at ambient. , It is more desirable to use a stoichiometric amount or slightly less than a stoichiometric amount of unsaturated phenol compound when making the phenol-functionalized poly(organosiloxane) fluids, so that no stripping or precipitation process is required to recover the final products. Additionally, if the reaction is carried out at temperatures higher than ambient, the solvent can be eliminated.

Another method of preparing the phenol-functionalized poly(organosiloxane) fluids is by reaction of dimethylamine terminated poly(organosiloxane) with a slight excess of 2,2-bis(4-hydroxyphenyl)hexafluoropropane as described in U.S. Pat. No. 5,233,008, which is incorporated herein by reference.

The release agent of this invention is useful as a lubricant or release aid in many industrial applications. The most preferred application is as a release agent to prevent toner offset onto the surface of a fuser member. A fuser member is used for fusing toner images to a receiver, for example in electrophotographic or printing machines.

The fuser member to which the release agent comprising a blend of non-phenol-functionalized poly(organosiloxane) and phenol-functionaliszed poly(organosiloxane) is applied can be of any known configuration. It can be a cylinder or a belt; it can be a heated member or a backup or pressure member. It can be internally or externally heated or unheated. The fuser member usually is part of a fuser assembly. The fuser assembly usually consists of a backup member, such as a roll or belt structure which cooperates with a heated fuser roll or belt to form a nip through which a receiver, such as copy paper or transparency passes so that toner images thereon contact the heated fuser roll or belt. The dimensions of the fuser assembly may be determined by one skilled in the art and generally are dictated by the requirements of the particular copying apparatus wherein the fuser assembly is employed. The dimensions are dependent upon the process speed and other parameters of the machine. Usually means are provided for applying a loading force to the fuser assembly to create nip pressure.

Fuser member materials include anodized aluminum and alloys thereof, steel, stainless steel, nickel, and alloys thereof, nickel plated copper, copper, glass, zinc, cadmium, and the like and various combinations of the above. These materials usually are coated with additional polymeric layers. The polymeric layers include such materials as silcones, fluoroelastomers, fluorosilicones and mixtures of such polymeric materials. Fuser members and coated fuser members have been disclosed in the prior art, for example see, U.S. Pat. Nos. 5,480,725; 4,853,737; 5,362,833; 5,248,339; 4,257,699 and 4,272,179 incorporated herein by reference. Further, fuser members are commercially available.

The greatest benefits of this invention are realized when the release agents are applied to a fuser member of a copying device wherein thermoplastic resin toner applied to a receiver in image configuration must be heated or fused at high temperatures, for example, about 200° C. in order to permanently fix the toner to the receiver.

The release agents of the present invention may be applied to the fuser member by any of the standard or conventional methods or devices known to those skilled in the art, and include application by wick, by padding, by brushes, by spraying, by wiper blade or the like. The release agent preferably is applied in an amount sufficient to cover the surface with a continuous film in order to provide the fuser member with a surface which releases thermoplastic resin toner heated by the fuser member. However, the release agent layer should not be so thick as to prevent heat transfer from the fuser member to the thermoplastic resin toner undergoing fusing upon a receiver. Generally, the release agent should be applied to a thickness in a range of about 0.5 micron to about 10 microns in thickness.

During operating of any electrostatic reproducing apparatus, it is preferred to continuously apply the release agent onto the heated fuser member in order to replace any release agent which is retained by the receiver either by absorbtion or adherence of the release agent to the receiver. However, in embodiments where there is little or no loss of the release agent from the surface of the fuser member, continuous application of the release agent may not be necessary, and it may be preferred to utilize application techniques which only apply release agent intermittently to the surface.

The toner that is fused by the fuser member of this invention can consist of any known toner composition which is fused to a receiver by a fuser member. The toner can be comprised of a thermoplastic resin and other addenda including colorant such as dyes and/or pigments. An example of a conventional pigment is carbon black. Examples of binder polymers include vinyl polymers, such as homopolymers and copolymers of styrene and condensation polymers such as polyesters and copolyesters. Particularly useful binder polymers are styrene polymers of from 40 to 100 percent by weight of styrene or styrene homologs and from 0 to 45 percent by weight of one or more lower alkyl acrylates or methacrylates. Additional examples include polyesters of aromatic dicarboxylic acids with one or more aliphatic diols, such as polyesters of isophthalic or terephthalic acid with diols such as ethylene glycol, cyclohexane dimethanol and bisphenols. Patents describing toner compositions include U.S. Pats. No. Re. 25,136 and 31,072; and U.S. Pat. Nos. 5,247,034; 4,160,644, 4,416,965; 4,624, 907; 4,814,250; 4,840,864; 2,659,670; 2,754,408; 2,788, 288, which are all incorporated herein by reference. Many useful toner compositions are known to a person of ordinary skill in the art and are available commercially.

The following examples illustrate the preparations of phenol-functionalized poly(organosiloxane) fluids, release agents of the invention and the ability of the release agents of the invention to maintain their fluidity at temperatures above 200° C.

EXAMPLE 1

To a 250 ml Erlenmeyer flask were added 10 grams of toluene, 2.68 grams of ortho-allyl phenol, and 17.5 grams of PS-542 (hydride-terminated PDMS, weight average molecular weight (M.W.) 17,500, sold by Petrarch Systems). The mixture was stirred at ambient to form a clear solution. 0.2 grams of platinum (Pt) catalyst (prepared by diluting 3 parts of PC075, from Petrarch Systems, with 7 parts of toluene) was then added, and the reaction was allowed to proceed at ambient for 24 hrs. The product was then extracted with 100 ml portions of methanol twice to remove excess phenol compound. After stripping residual methanol on a rotary evaporator, 17 grams of phenol-functional PDMS were obtained. The phenol-terminated PDMS had a viscosity of about 500 ctsk at 25° C. and weight average M.W. of 17,500.

EXAMPLE 2

22 grams of PS-124.5 (a copolymer of methylhydro/dimethyl polysiloxane containing about 4 mole percent methylhydro units, weight average M.W. 13,300, sold by Petrarch Systems), 8.05 grams of ortho-allyl phenol, and 10 grams of toluene were mixed. 0.2 grams of Pt catalyst as prepared in Example 1 were added to the mixture. The mixture was stirred at ambient for 48 hrs. The reaction mixture was then extracted with 150 ml portions of methanol twice, and the residual methanol was stripped off on a rotary evaporator to yield 23.8 grams of phenol-functionalized PDMS. The phenol-functionalized PDMS had a viscosity of 250 ctsk at 25° C. and a weight average M.W. of 13,300. The phenol group was attached to a side chain on the siloxane backbone.

EXAMPLE 3

To a 500 ml. Erlenmeyer flask was added 100 grams of PS-123, (Methylhydro/dimethyl polysiloxane containing about 30 mole percent methylhydro units, weight average M.W. 2,000, sold by Petrarch Systems), 60 grams of orthoallyl phenol, and 50 grams of toluene. The mixture was stirred at ambient, and 0.48 grams of PC075, as prepared in Example 1, were added to initiate the silane reaction which was monitored both by IR and NMR spectra. The reaction was complete in less than three hours, and the toluene was stripped off on a rotary evaporator at 55° C., to obtain a lightly tanned, viscous liquid. The phenol-functionalized PDMS had a viscosity of 25 ctsk at 25° C. and a weight average M.W. of 2,000. The phenol group was attached to a side chain on the siloxane backbone.

EXAMPLE 4

In a one liter 3-necked flask, equipped with a mechanical stirrer, an additional funnel, and a thermometer, were mixed 100 grams of PS-357, (hydride-terminated PDMS, wight average M.W. 400, sold by Petrarch Systems). 50 grams of toluene, and 0.5 grams of PC075, as prepared in Example 1. 67 grams of orthoallyl phenol was then added dropwise to the reaction flask in such a manner that the temperature remained below 60° C. The reaction was allowed to continue until no allyl groups were present as monitored by proton NMR. The toluene was subsequently removed on a rotary evaporator at 60° C. The phenol-terminated PDMS had a viscosity of about 2 ctsk at 25° C. and weight average M.W. of 600.

EXAMPLE 5

2,2-Bis(4-hydroxyphenyl)hexafluoropropane (37.5 g) was dissolved in toluene (75 mil) under a nitrogen atmosphere by heating to 110° C. A dimethyl(dimethylamino)silyl-terminated polydimethylsiloxane (PDMS) obtainable from Petrarch as PS383 (48 g) and having a molecular weight of about 500 and a PDMS block length of about 5, was added dropwise to the stirred solution over about 90 min.

An additional 12 grams of the amino-PDMS were added and heating and stirring were continued overnight. The reaction mixture was cooled to 60° C. and concentrated under a vacuum to remove residual dimethylamine and toluene. The product had the following structure:

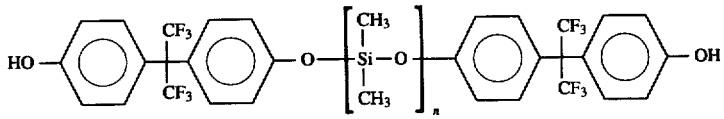

where n is 400, the number average molecular weight was 3,160, and the weight average molecular weight was 9,340. The yield was 80–90%.

EXAMPLE 6

A 1 liter three-neck round bottom flask was charged with 200 grams of octamethylcyclotetrasiloxane and 2.2 grams of tetramethylammonium siloxanolate (1.5–2 mole % nitrogen). The mixture was stirred and heated to 95° C. After 30 minutes 25.5 grams of PS383 were added to the viscous solution and stirred at 95° C. overnight. The temperature was then raised to 150° C. for 1 hour to deactivate the catalyst, then unreacted cyclics were removed by vacuum distillation at 170° C. The residual material contained the desired dimethyl(dimethylamino)silyl-terminated polydimethylsiloxane. The preparation described for Example 5 was repeated except that the just-produced dimethyl(dimethylamino)silyl-terminated polydimethylsiloxane was substituted for the PS383 in Example 5. The resulting phenol-functionalized PDMS had the same structure as Example 5 except that n was 6,000, the number average molecular weight was 107,000, and the weight average molecular weight was 211,000.

EXAMPLE 7

Example 6 was repeated except that instead of 25.5 grams 7.32 grams of PS383 was added to the mixture. The product had the structure indicated in Example 5 except that n was 20,800, the number average molecular weight was 18,700, and the weight average molecular weight was 38,800.

EFFECTS OF PHENOL-FUNCTIONALIZED POLY(ORGANOSILOXANE) FLUIDS ON THE THERMAL STABILITY OF POLY(ORGANOSILOXANE) FLUIDS

The phenol-functional PDMS produced according to Example 3 was added to 60,000 ctsk non-phenol-functionalized PDMS fluid, in the amounts ranging from 0.05% to 0.5% by weight of the PDMS fluid to produce the release agents of this invention. The release agent was gently mixed by a mechanical blender and then placed in a flask. Samples consisting of the mixtures of phenol-functional PDMS and PDMS and a sample of PDMS were heated in a convection oven at 225° C., and the viscosities were monitored over about 220 hours. The results are in FIG. 1.

The phenol-functionalized polyorganosiloxanes of Examples 5, 6, and 7 were used to produce release agents of the invention and were tested like the phenol-functionalized PDMS of Example 3 except that the temperature of the oven was 200° C. The changes in the viscosity of the release agents were measured over 576 hours and are listed in Tables 1, 2 and 3.

TABLE 1

Results for Phenol-Functionalized Poly(organosiloxane) Fluid of Example 5 in Release Agent

| wt % of Ex 5 in release agent | Viscosity (ctsk) at | | | | |
|---|---|---|---|---|---|
| | 0 hr | 168 hr | 192 hr | 336 hr | 576 hr |
| 0% | 60,000 | 61,000 | 60,000 | 65,000 | 105,000 |
| 0.05% | 60,000 | 54,000 | 58,000 | 57,000 | 42,000 |
| 0.10% | 60,000 | 56,000 | 59,000 | 58,000 | 48,000 |
| 0.5% | 60,000 | 58,000 | 60,000 | 58,000 | 51,000 |

TABLE 2

Results for Phenol-Functionalized Poly(organosiloxane) Fluid of Example 6 in Release Agent

| wt % of Ex 6 in release agent | Viscosity (ctsk) at | | | | |
|---|---|---|---|---|---|
| | 0 hr | 168 hr | 192 hr | 336 hr | 576 hr |
| 0% | 60,000 | 61,000 | 60,000 | 65,000 | 105,000 |
| 0.05% | 60,000 | 59,000 | 59,000 | 55,000 | 60,000 |
| 0.10% | 60,000 | 56,000 | 55,000 | 55,000 | 60,000 |
| 0.5% | 60,000 | 61,000 | 57,000 | 55,000 | 48,000 |

TABLE 3

Results for Phenol-Functionalized Poly(organosiloxane) Fluid of Example 7 in Release Agent

| wt % of Ex 7 in release agent | Viscosity (ctsk) at | | | | |
|---|---|---|---|---|---|
| | 0 hr | 168 hr | 192 hr | 336 hr | 576 hr |
| 0% | 60,000 | 61,000 | 60,000 | 65,000 | 105,000 |
| 0.05% | 60,000 | 56,000 | 58,000 | 60,000 | 76,000 |
| 0.10% | 60,000 | 60,000 | 63,000 | 60,000 | 67,000 |
| 0.5% | 60,000 | 65,000 | 58,000 | 54,000 | 60,000 |

No gellation was noticed for the samples of the invention containing phenol-functionalized PDMS, while the control sample of PDMS showed a drastic increase in viscosity, sometimes accompanied by visible gel formation. The release agents of this invention have extended useful lives compared to poly(organosiloxane) fluid release agents without added phenol-functionalized poly(organosiloxane) fluid.

We claim:

1. A release agent comprising a blend of 90 to 99.9999 percent by weight of a non-phenol functionalized, non-reactive and non-functionalized poly(organosiloxane) fluid and 0.0001 to 10 percent by weight of a phenol functionalized poly(organosiloxane) fluid wherein the organo groups are selected from the group consisting of alkyl, aryl, alkylaryl and mixtures thereof, weight percents being based on the total weight of release agent.

2. The release agent of claim 1 comprising a blend of 99 to 99.99 percent by weight of said non-phenol-functionalized poly(organosiloxane) fluid and 0.01 to 1 percent by weight of said phenol-functionalized poly(organosiloxane) fluid.

3. The release agent of claim 1 wherein said non-phenol-functionalized poly(organosiloxane) fluid comprises poly(dimethylsiloxane) fluid.

4. The release agent of claim 1 wherein said non-phenol-functionalized poly(organosiloxane) fluid comprises poly(dimethyldiphenylsiloxane) fluid.

5. The release agent of claim 1 wherein said non-phenol-functionalized poly(organosiloxane) fluid comprises poly(dimethylsiloxane) fluid having the following structure:

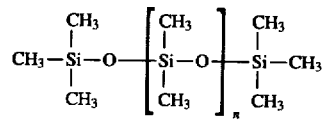

where n is a number from 1 to 300, and the viscosity of said poly(dimethylsiloxane) fluid is 1 to 100,000 centistokes at 25° C.

6. The release agent of claim 1 wherein said non-phenol-functionalized poly(organosiloxane) fluid comprises poly(dimethyldiphenylsiloxane) fluid having the following structure:

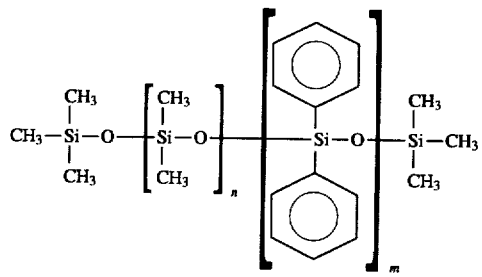

where n is a number from 1 to 300, m is a number from 1 to 300, and the viscosity of said poly(dimethyldiphenylsiloxane) fluid is from 1 to 100,000 ctsk.

7. The release agent of claim 1 wherein said phenol-functionalized poly(dimethylsiloxane) fluid comprises the following structure:

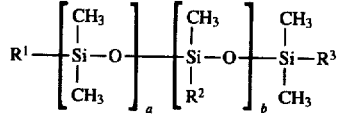

where $R^1$, $R^2$ and $R^3$ are independently methyl or phenol group; where at least one of $R^1$, $R^2$ and $R^3$ is a phenol group, and when $R^2$ is a phenol group, a is 40 mol % to 99.5 mol %; and b is 0.5 mol % to 60 mol % based on 100 mol %.

8. The release agent of claim 7 wherein said phenol group comprises the following structure:

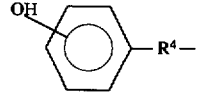

where $R^4$ is a $C_{1-30}$ alkyl, $C_{1-30}$ aryl, or $C_{1-30}$ alkylaryl.

9. The release agent of claim 7 wherein said phenol group comprises the following structure:

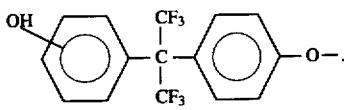

10. The release agent of claim 8 wherein said non-phenol-functionalized poly(organosiloxane) fluid is selected from the group consisting of poly(dimethylsiloxane) fluid and poly(dimethyldiphenylsiloxane) fluid.

11. The release agent of claim 9 wherein said non-phenol-functionalized poly(organosiloxane) fluid is selected from the group consisting of poly(dimethylsiloxane) fluid and poly(dimethyldiphenylsiloxane) fluid.

12. The release agent of claim 7 wherein $R^1$ and $R^3$ are phenol groups and $R^2$ is a methyl.

13. A fuser member, for fusing toner images to a receiver, having a release agent applied to said surface of said fuser member, said release agent comprising a blend of 90 to 99.9999 percent by weight of a non-phenol functionalized, non-reactive and non-functionalized poly(organosiloxane) fluid and 0.0001 to 10 percent by weight of a phenol functionalized poly(organosiloxane) fluid wherein the organo groups are selected from the group consisting of alkyl, aryl, alkylaryl and mixtures thereof, weight percents being based on the total weight of release agent.

14. The fuser member of claim 13 wherein said release agent comprises a blend of 99 to 99.99 percent by weight of said non-phenol-functionalized poly(organosiloxane) fluid and 0.01 to 1 percent by weight of said phenol-functionalized poly(organosiloxane) fluid.

15. The fuser member of claim 13 wherein said non-phenol-functionalized poly(organosiloxane) fluid has a structure selected from the group consisting of

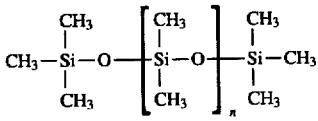

and

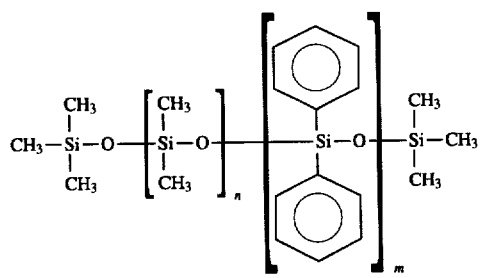

and mixtures of the above structures, where n is a number from 1 to 300, m is a number from 1 to 300, and the viscosity of said non-phenol-functionalized poly(organosiloxane) fluid is from 1 to 100,000 ctsk.

16. The fuser member of claim 13 wherein said phenol-functionalized poly(organosiloxane) fluid has the structure:

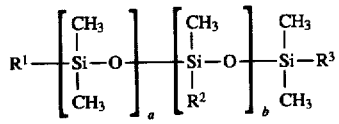

where $R^1$, $R^2$ and $R^3$ are independently methyl or a phenol group; where at least one of $R^1$, $R^2$ and $R^3$ is a phenol group, and when $R^2$ is a phenol group, a is 40 mol % to 99.5 mol %; and b is 0.5 mol % to 60 mol % based on 100 mol %; and said phenol group has the structure:

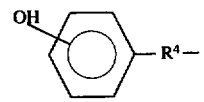

where $R^4$ is $C_{1-30}$ alkyl, $C_{1-30}$ aryl, or $C_{1-30}$ alkylaryl.

17. The fuser member of claim 13 wherein said phenol-functionalized poly(organosiloxane) fluid has the structure:

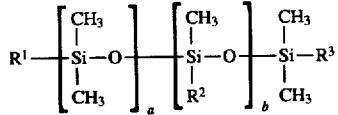

where $R^1$, $R^2$ and $R^3$ are independently methyl or a phenol group; where at least one of $R^1$, $R^2$ and $R^3$ is a phenol group, and when $R^2$ is a phenol group, a is 40 mol % to 99.5 mol %; and b is 0.5 mol % to 60 mol % based on 100 mol %; and said phenol group has the structure:

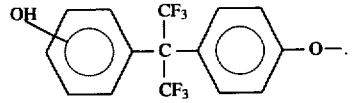

* * * * *